US007522914B1

(12) United States Patent
Cook

(10) Patent No.: US 7,522,914 B1
(45) Date of Patent: Apr. 21, 2009

(54) COMMUNICATION SYSTEM FOR CALL ALERTING

(75) Inventor: Fred S. Cook, Olathe, KS (US)

(73) Assignee: Sprint Communications Company LP., Overland Park, KS (US)

( * ) Notice: Subject to any disclaimer, the term of this patent is extended or adjusted under 35 U.S.C. 154(b) by 742 days.

(21) Appl. No.: 09/920,489

(22) Filed: Aug. 1, 2001

(51) Int. Cl.
  *H04M 3/42* (2006.01)
(52) U.S. Cl. .................. 455/417; 455/415; 455/414.1; 455/426.1; 455/567; 379/60; 379/59
(58) Field of Classification Search .................. 455/567, 455/566, 552.1, 417, 415, 458, 445, 414.1, 455/414.4; 379/57, 54
See application file for complete search history.

(56) References Cited

U.S. PATENT DOCUMENTS

| | | | | |
|---|---|---|---|---|
| 5,325,419 A | * | 6/1994 | Connolly et al. | 455/435.1 |
| 5,499,290 A | * | 3/1996 | Koster | 379/242 |
| 5,511,111 A | * | 4/1996 | Serbetcioglu et al. | 379/88.01 |
| 6,061,570 A | * | 5/2000 | Janow | 455/458 |
| 6,563,788 B1 | * | 5/2003 | Torba et al. | 370/229 |
| 6,590,965 B1 | * | 7/2003 | Poole et al. | 379/88.19 |
| 6,643,506 B1 | * | 11/2003 | Criss et al. | 455/419 |
| 2002/0006811 A1 | * | 1/2002 | Diebolt et al. | 455/557 |

* cited by examiner

*Primary Examiner*—Charles N Appiah
*Assistant Examiner*—Randy Peaches

(57) ABSTRACT

A communication system alerts wireless communication interfaces of incoming calls. The communication system includes a service control point. The service control point receives a call set-up message for an incoming call. The service control point processes the call set-up message to identify a wireless communication interface. The service control point then generates an alert message indicating the incoming call and caller information from the call set-up message. The service control point transmits the alert message to the wireless communication interface. The service control point receives a response message wherein the response message indicates a destination communication device to receive the incoming call. The service control point processes the response message to generate and transmit a routing instruction that connects the incoming call to the destination communication device.

19 Claims, 7 Drawing Sheets

COMMUNICATION SYSTEM FOR CALL ALERTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication networks, and in particular, to a communication system that alerts wireless communication interfaces for incoming calls.

2. Description of the Prior Art

When a call comes into a communication device such as a telephone, pager, or facsimile machine, the communication device alerts a user by some type of audio, visual, or other sensual notification for the incoming call. Wireless communication devices such as cell phones, pagers, and personal digital assistants (PDAs) provide the user mobility to be notified of incoming calls wherever the user may be located. Recently, these wireless communication devices have expanded in number and functionality. Unfortunately, the wireless communication devices cannot handle all types of incoming calls. For example, a wireless PDA cannot accept incoming facsimile (fax) calls. Thus, mobile users are not notified and do not receive all types of incoming calls.

Also, when a call comes into a shared pool of communication devices, the communication equipment does not know which communication device is available and capable to handle the call for a specific user. For handling unavailable communication devices, prior communication systems include call forwarding that forwards a call from an unavailable communication device to an available communication device. To handle a shared facsimile machine, one prior communication system notifies users after the call has been accepted like facsimile software that e-mails a user after the fax has been received.

Call alerting is one function in setting up a call. A service control point (SCP) is a communication device used in call set-up to translate dialed numbers to route calls to specific destinations. In one example, an SCP translates a dialed 800 number to route the 800 call to the appropriate, long distance carrier that is responsible for the dialed 800 number.

One prior system in call center routing uses an SCP and a call center processor to route toll free calls for a call center to a specific agent to handle the call. FIG. 1 depicts a communication system with a call center in the prior art. When a telephone 110 initiates a call to a call center 150, a switch 130 generates and transmits a Transaction Capabilities Application Part (TCAP) query to an SCP 120 for call set-up. The SCP 120 processes the TCAP query. After identifying the call center 150 from the TCAP query, the SCP 120 generates and transmits a routing query to the call center processor 152. The call center processor 152 processes the routing query to identify which agent at the call center 150 has the availability and capability to handle the call. The call center processor 152 replies to the SCP 120 with call information identifying the agent telephone 154. The SCP 120 replies to the switch 130 with the call information identifying the agent telephone 154. The switch 130 extends the call from the telephone 110 to the switch 140. The switch 140 then extends the call to the agent telephone 154. One problem is the call center processor 152 that determines the call routing for the call center 150 is not mobile. Thus, a mobile user cannot be notified of incoming calls and decide where to route the incoming calls.

Another prior communication system uses conference bridging to connect numerous users into one communication session. Conference bridging is a communication service that provides conference call capabilities to users without a switchboard or conference call equipment. A user calls a bridge operator with the conference call information such as time of day and the length of the conference bridge. The bridge operator then assigns a bridge number to the conference bridge. Then the bridge operator then calls and connects the other users to the conference bridge. Alternatively, the other users call and proceed through a series of conference bridge access sequences. The user then enters the bridge number and joins the respective conference bridge. One disadvantage of conference bridging is there are numerous steps that a user must follow to set up a conference bridge and notify all users of the conference bridge number.

Unfortunately, none of these prior systems provide a mobile user the ability to be notified of incoming calls and to route the incoming calls to a specific communication device that can handle the incoming call.

SUMMARY OF THE INVENTION

The invention solves the above problems by alerting a wireless communication interface of incoming calls and then generating a routing instruction to connect the incoming call to the destination communication device. A service control point (SCP) receives a call set-up message for an incoming call. The SCP processes the call set-up message to identify a wireless communication interface. The SCP then generates an alert message indicating the incoming call and caller information from the call set-up message. The SCP transmits the alert message to the wireless communication interface. The SCP receives a response message wherein the response message indicates a destination communication device to receive the incoming call. The SCP then processes the response message to generate a routing instruction that connects the incoming call to the destination communication device. The SCP then transmits the routing instruction.

In some aspects of the invention, the wireless communication interface is within a wireless communication device. Some examples of wireless communication devices are pagers, personal digital assistants, and cellular phones. In other aspects, the call set-up message is a Transaction Capabilities Application Part query. Some alert messages include called number, dialed number, or caller number. In other aspects, the SCP determines whether the incoming call is to be intercepted for the called party. In still another aspect, the SCP generates a session for the incoming call with a session identifier.

In one aspect of the invention, a wireless base station is connected to the SCP and transfers the alert message to the wireless communication interface. In another aspect, a switching system is connected to the SCP and processes the routing instruction that connects the incoming call with the destination communication device.

In another aspect, the wireless communication device receives and processes an alert message indicating an incoming call and caller information from a service control point.

The wireless communication device then determines a destination communication device for the incoming call. The wireless communication device generates and transmits a response message indicating a destination communication device to receive the incoming call to the service control point. In another aspect, the response message includes a session identification provided on the wireless communication device as a registration identification on the destination communication device. The destination communication device then signals back to the SCP via a data or signaling network.

By notifying a user of an incoming call, the invention advantageously allows all communications types to be handled by a destination communication device that is available and capable to handle the incoming call. A mobile user can then be notified through their own wireless communication device of an incoming call and find a destination communication device to receive the incoming call. Additionally, the invention allows the user to specify which destination communication device in a shared pool of communication devices should receive the incoming call.

BRIEF DESCRIPTION OF THE DRAWINGS

The same reference number represents the same element on all drawings.

DETAILED DESCRIPTION OF THE INVENTION

Figure 1:
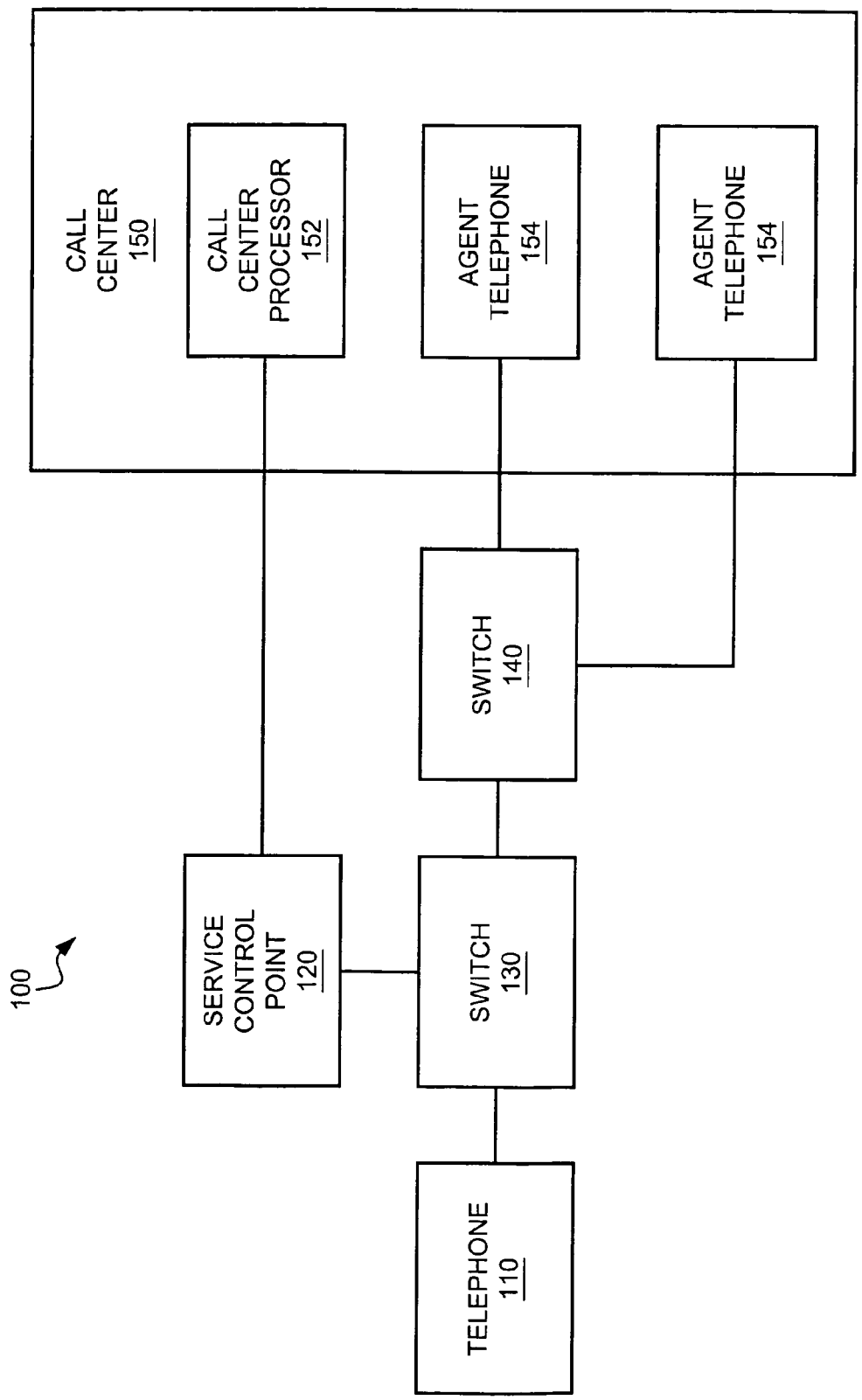
FIG. 1 is a block diagram of a communication system with a call center in the prior art.
Figure 2:
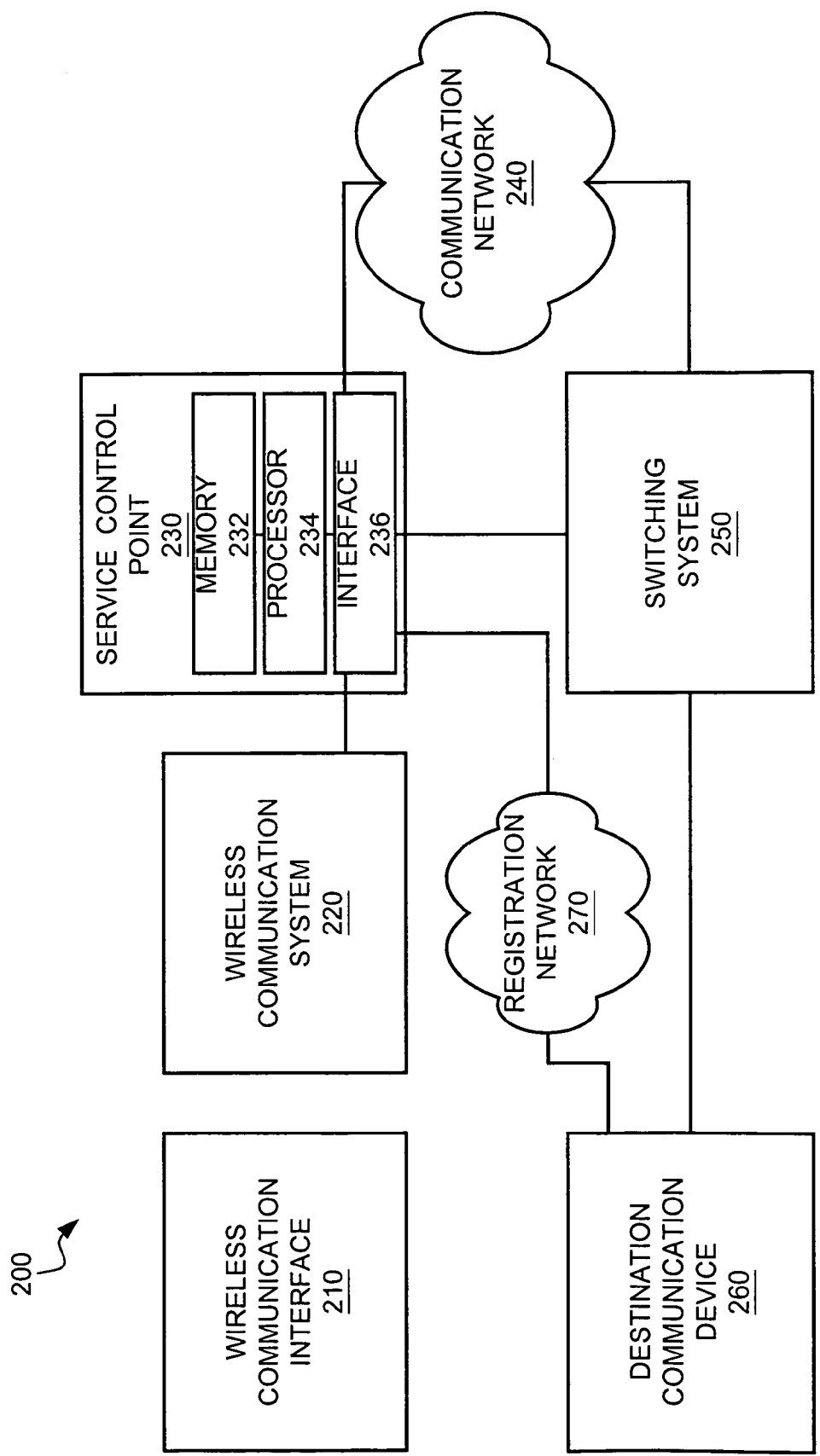
FIG. 2 is a block diagram of a communication system in an example of the invention.
Figure 3:
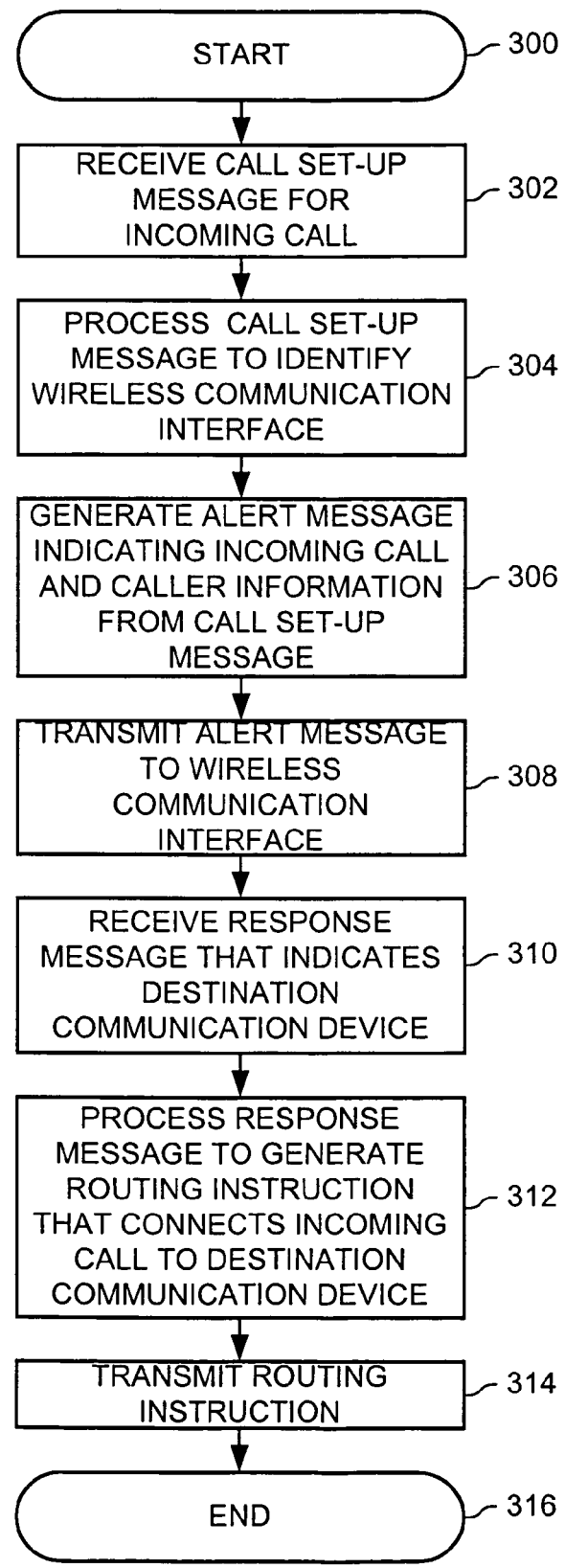
FIG. 3 is a flow chart of a service control point in an example of the invention.

Communication System with a Service Control Point—FIGS. 2-3

FIG. 2 is a block diagram of a communication system 200 in an example of the invention. The communication system 200 includes a wireless communication interface 210, a wireless communication system 220, a service control point (SCP) 230, a communication network 240, a switching system 250, a destination communication device 260, and a registration network 270. The SCP 230 comprises a memory 232, a processor 234, and an interface 236. The wireless communication interface 210 is configured to communicate using wireless signals with the wireless communication system 220. The wireless communication system 220 is connected to the interface 236. The interface 236 is connected to the processor 234. The processor 234 is connected to the memory 232. The interface 236 is also connected to the communication network 240, the switching system 250, and the registration network 270. The communication network 240 is connected to the switching system 250. The switching system 250 is connected to the destination communication device 260. The destination communication device 260 is connected to the registration network 270. Various communication equipments such as signal transfer points are not shown in FIG. 2 for the sake of simplicity and clarity.

The wireless communication interface 210 is any interface in a user communication device that exchanges wireless signals with the wireless communication system 220. In some embodiments, the wireless communication interface 210 is included within a wireless communication device such as a pager, a personal digital assistant, and a cellular phone. The wireless communication system 220 is any system configured to exchange wireless signals with the wireless communication interface 210. One example of the wireless communication system 220 is a wireless base station.

The memory 232 stores data or instructions for the processor 234 temporarily and/or permanently. The processor 234 executes instructions stored in the memory 232. The interface 236 exchanges data, messages, signaling, or instructions between the processor 234 and the wireless communication system 220, the communication network 240, and switching system 250. Those skilled in the art understand the operation of conventional processors, memory, and interfaces.

The service control point 230 is a service control point configured to (1) receive a call set-up message for an incoming call, (2) process the call set-up message to identify the wireless communication interface 210, (3) generate an alert message indicating the incoming call and caller information from the call set-up message, (4) transmit the alert message to the wireless communication interface 210, (5) receive a response message wherein the response message indicates a destination communication device to receive the incoming call, (6) process the response message to generate a routing instruction that connects the incoming call to the destination communication device, and (7) transmit the routing instruction.

The incoming call is any call that carries voice or data communications. The call set-up message is any signaling, message, or information used to set up a call. One example of the call set-up message is a Transaction Capabilities Application Part (TCAP) query. The alert message is any message, signaling, or information used to notify the wireless communication interface 210 of the incoming call. The caller information is any information related to the call such as called number, dialed number, and caller number. The response message is any message, signaling, or instruction that indicates a destination communication device to receive the incoming call. The routing instruction is any signaling, message or instruction that causes communication equipment to route, switch, or direct a call.

The communication network 240 is a plurality of communication equipment that forms a network that carries communications. One example of the communication network 240 is the Public Switched Telephone Network. Those skilled in the art understand that all the equipment in the communication system 200 may be parts included within the communication network 240. The communication network 240 is separate for the sake of simplicity. The switching system 250 is any device or plurality of device configured to route, switch, or direct communications based on routing instructions. One example of the switching system 250 is a switch. The destination communication device 260 is a device or a plurality of communication devices configured to receive an incoming call. Some examples of the destination communication device are telephones and facsimile machines.

In operation, an incoming call is initiated from the communication network 240. To set-up the incoming call, the communication network 240 transmits a call set-up message to the service control point 230. FIG. 3 depicts a flow chart of the SCP 230 in an example of the invention. FIG. 3 begins in step 300. In step 302, the SCP 230 receives a call set-up message for an incoming call. In step 304, the SCP 230 processes the call set-up message to identify the wireless communication interface 210.

In step 306, the SCP 230 then generates an alert message indicating the incoming call and caller information from the call set-up message. In step 308, the SCP 230 transmits the alert message to the wireless communication interface 210. In step 310, the SCP 230 receives a response message wherein the response message indicates a destination communication device to receive the incoming call. In step 312, the SCP 230 processes the response message to generate a routing instruction that connects the incoming call to a destination communication device 260. The SCP 230 then transmits the routing instruction in step 314. FIG. 3 ends in step 316. The switching system 250 then connects the incoming call to the destination communication device 260 based on the routing instruction. The destination communication device 260 then receives the incoming call.

In one embodiment, the response message includes a session identification provided on the wireless communication interface 210 as registration identification on the destination communication device 260. The destination communication device 260 then signals back with the registration identification to the SCP 230 via the registration network 270. The registration network 270 may be a data or signaling network.

By notifying a user of an incoming call, the communication system 200 advantageously allows all communications types to be handled by a destination communication device 260 that is available and capable to handle the incoming call. A mobile user can then be notified through their own wireless communication device of an incoming call and find a destination communication device 260 to receive the incoming call. Additionally, the communication system 200 allows the user to specify which destination communication device 260 in a shared pool of communication devices should receive the incoming call.

Figure 4:
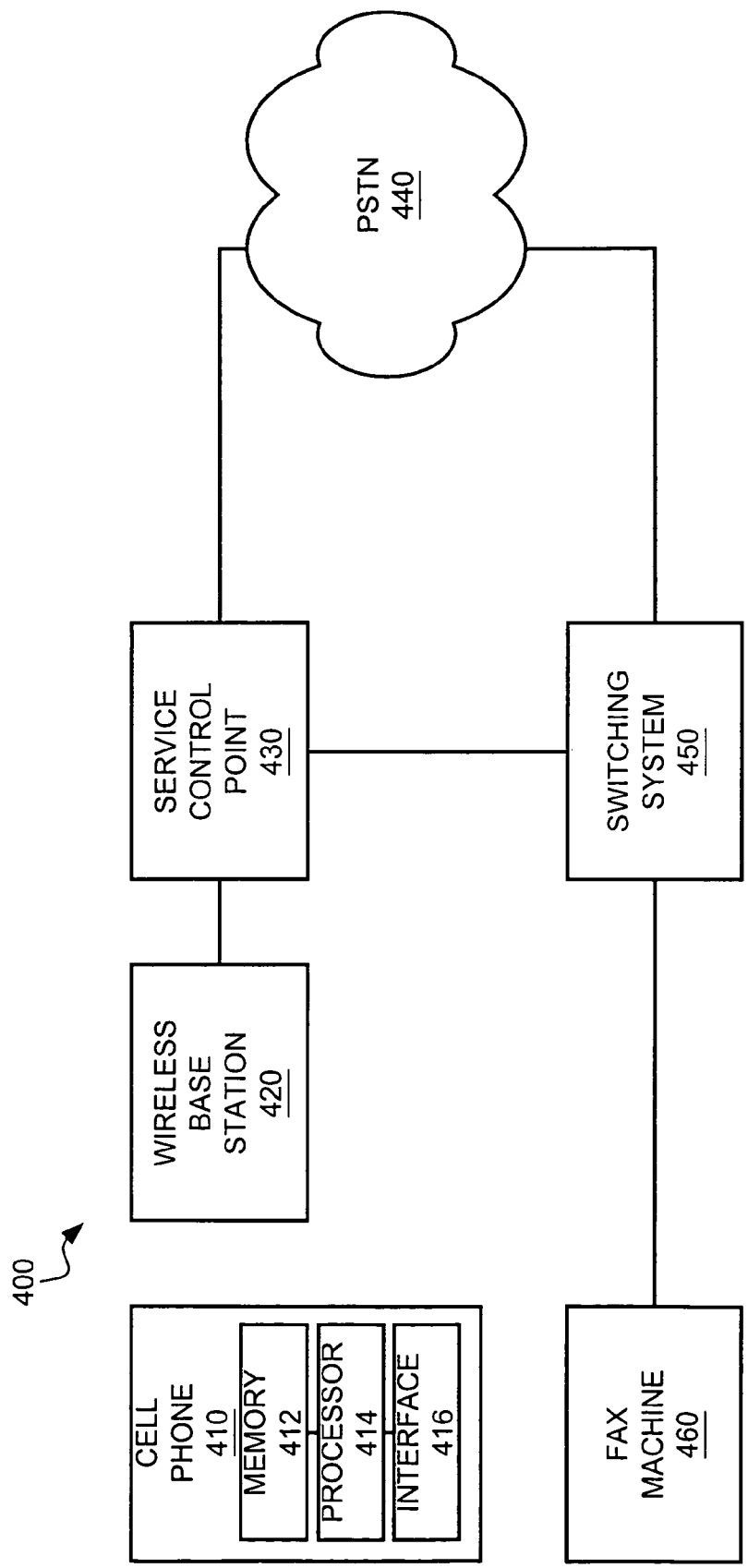
FIG. 4 is a block diagram of a communication system with a cell phone and a facsimile machine in an example of the invention.
Figure 5:
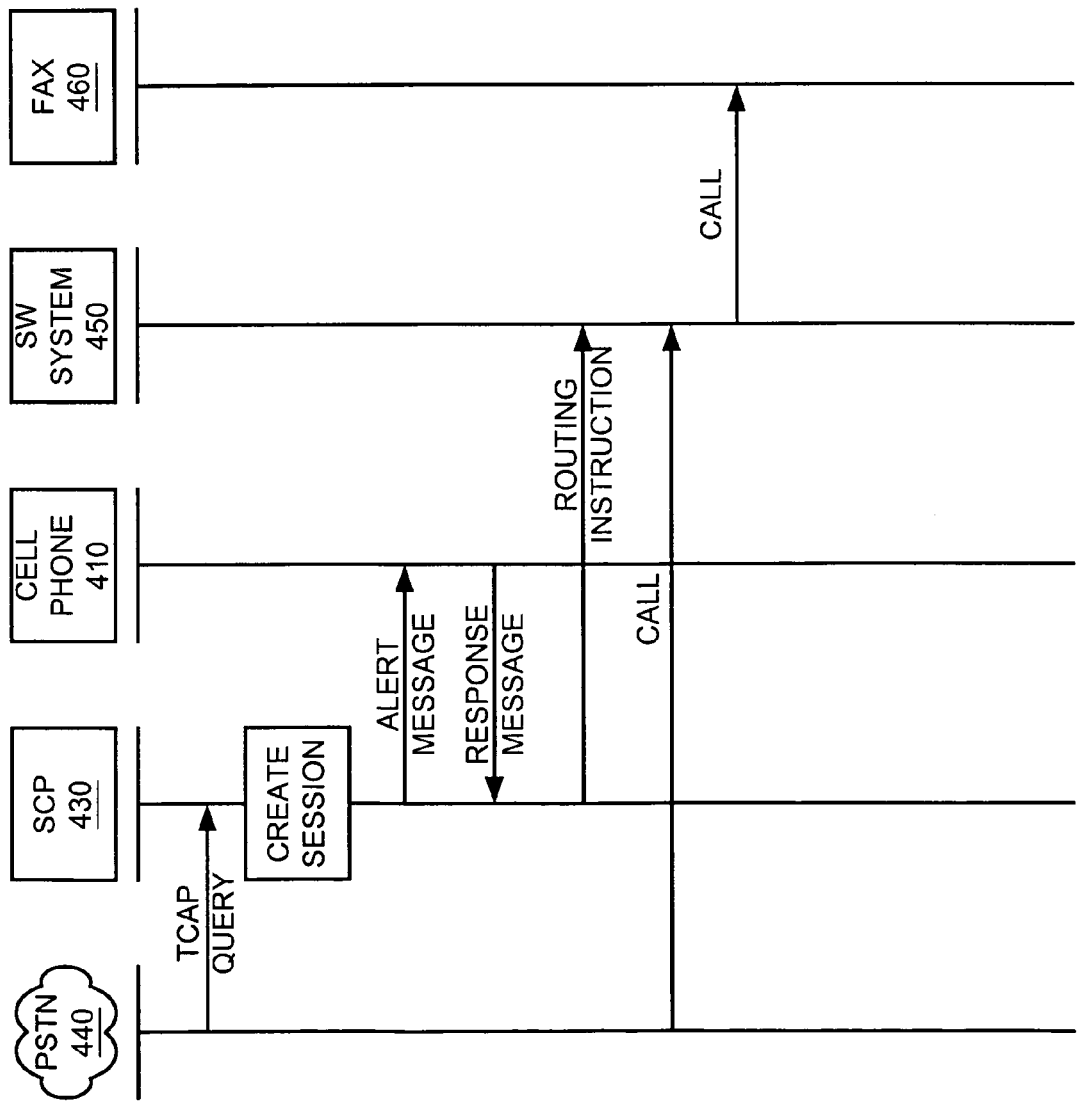
FIG. 5 is a message sequence chart of a communication system with a cell phone and a facsimile machine in an example of the invention.

Communication System with a Cell Phone and a Facsimile Machine—FIGS. 4-5

FIGS. 4-5 disclose one embodiment of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention.

In this embodiment, an incoming fax call is directed to a mobile user. The mobile user receives the incoming fax call from a facsimile machine in a shared pool of facsimile machines. FIG. 4 depicts a block diagram of a communication system 400 with a cell phone 410 and a facsimile machine 460 in an example of the invention. The communication system 400 comprises the cell phone 410, a wireless base station 420, a service control point 430, a Public Switched Telephone Network (PSTN) 440, a switching system 450, and the facsimile machine 460. The cell phone 410 comprises a memory 412, a processor 414, and an interface 416. The cell phone 410 is configured to communicate with the wireless base station 420 using wireless signals. The wireless base station 420 is connected to the service control point 430. The service control point 430 is connected to the PSTN 440 and the switching system 450. The PSTN 440 is connected to the switching system 450. The switching system 450 is connected to the facsimile machine 460.

The memory 412 stores data or instructions for the processor 414 temporarily and/or permanently. The processor 414 executes instructions stored in the memory 412. The interface 416 exchanges data, messages, signaling, or instructions between the processor 414 and the wireless communication system 420. Those skilled in the art understand the operation of conventional processors, memory, and interfaces.

FIG. 5 depicts a message sequence chart for the communication system 400 with the cell phone 410 and the facsimile machine 460 in an example of the invention. The PSTN 440 generates and transmits a TCAP query to the SCP 430 to set up an incoming call. The SCP 430 processes the TCAP query for the incoming call and determines that the incoming call for the called party should be intercepted. In one embodiment, the configuration of the Advanced Intelligent Network digit translation trigger determines whether an incoming call for the called party is intercepted. The SCP 430 then creates a session with a session identifier. A session is any situation that the SCP 430 creates for monitoring, tracking, or representing the incoming call. The session identifier is any number, tag, or identification that identifies the session.

The SCP 430 then generates and transmits an alert message for the incoming call to the cell phone 410 via the wireless base station 420. In one embodiment, the alert message comprises the session ID and the Automatic Number Identification. The cell phone 410 then receives the alert message. The user recognizes the incoming call is for a facsimile transmission. The user then locates a facsimile machine from a pool of facsimile machines. The user then enters the facsimile machine phone number into the cell phone 410. The cell phone 410 then generates and transmits a response message including the facsimile machine phone number to the SCP 430. The response message is any message, signaling, or instruction that indicates a destination communication device to receive the incoming call. The SCP 430 processes the response message to generate and transmit a routing instruction that includes the facsimile machine phone number to the switching system 450. Once the PSTN 440 extends the incoming call to the switching system 450, the switching system 450 routes the incoming call to the facsimile machine 460 based on the routing instruction.

Figure 6:
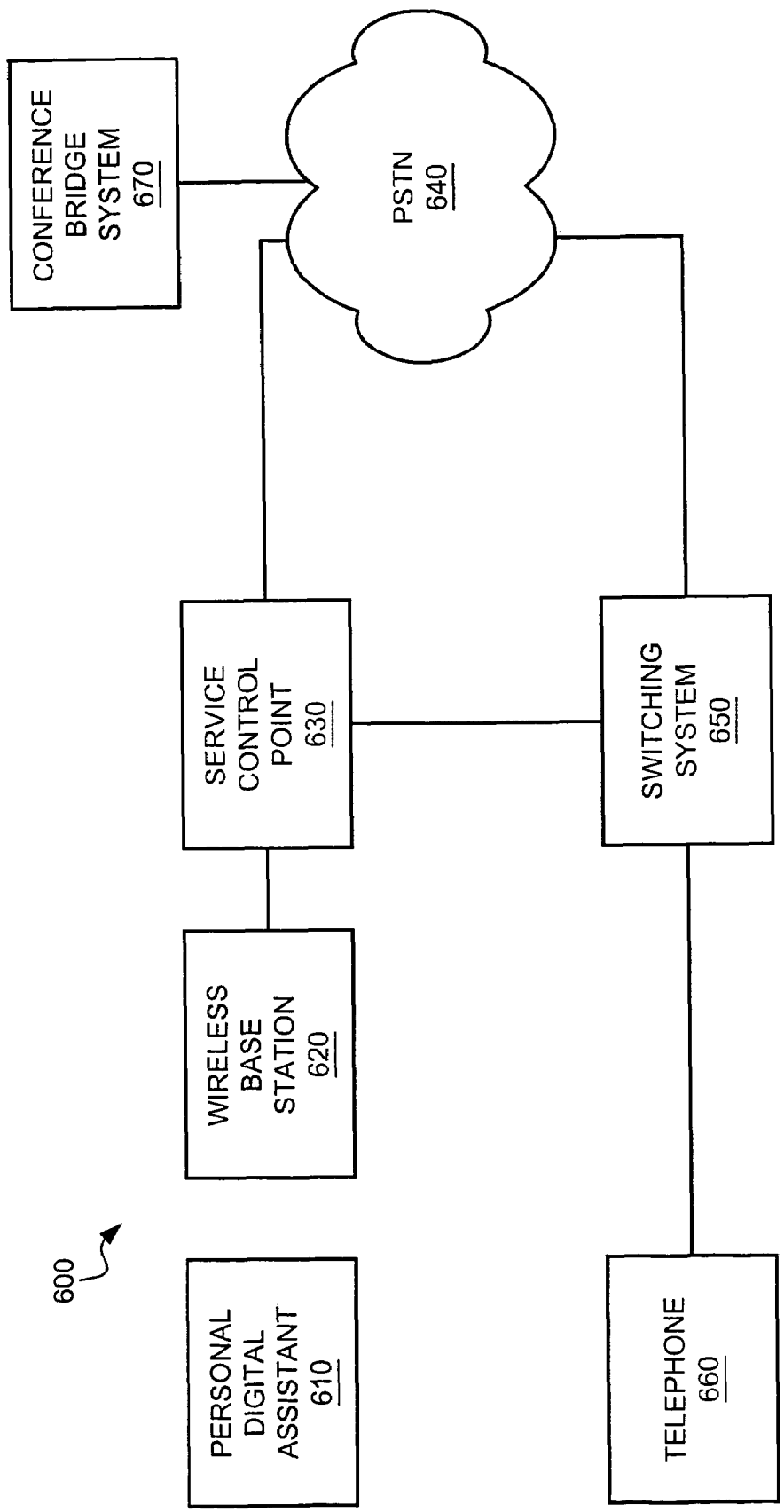
FIG. 6 is a block diagram of a communication system with a personal digital assistant and a telephone in an example of the invention.
Figure 7:
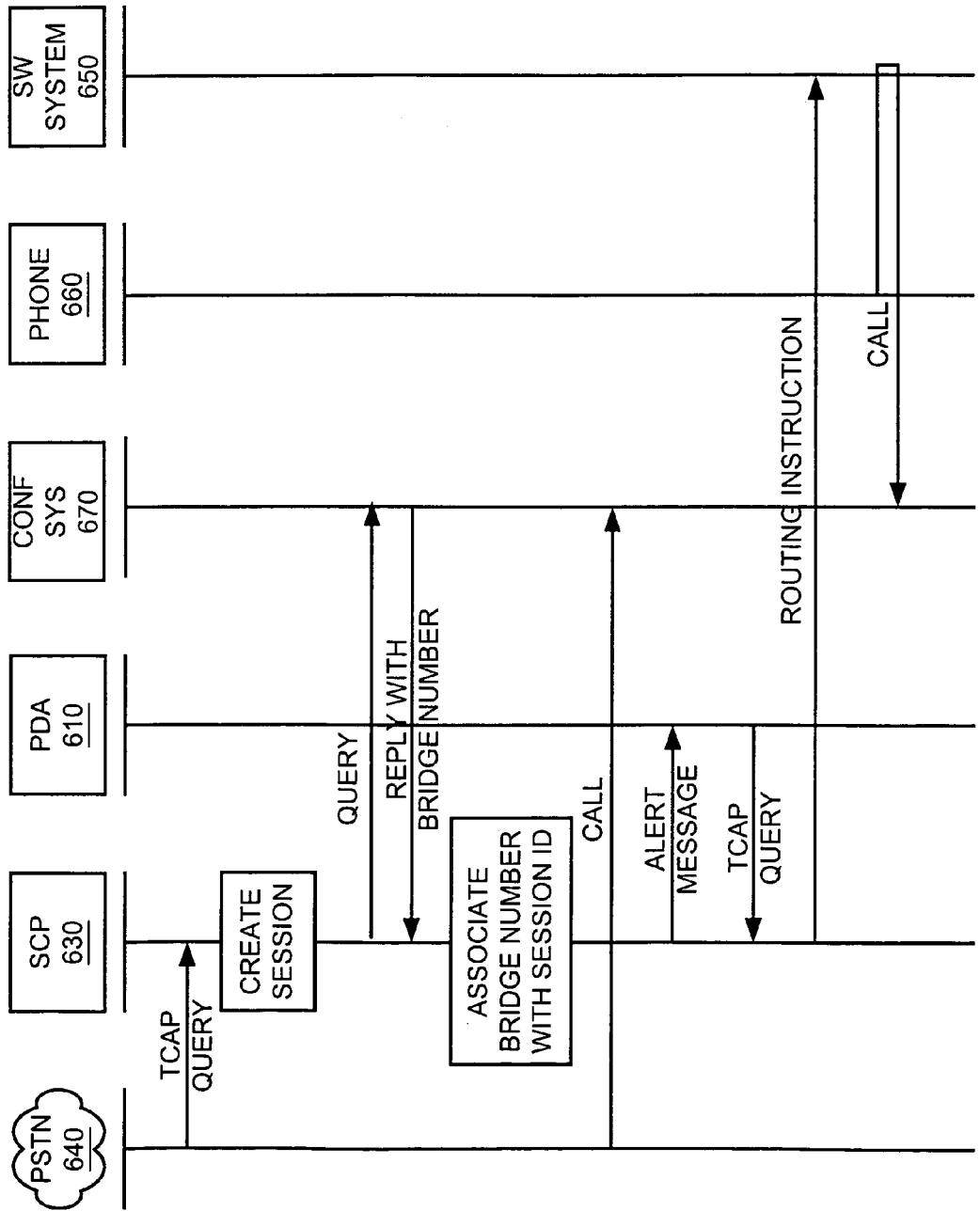
FIG. 7 is a message sequence chart of a communication system with a personal digital assistant and a telephone in an example of the invention.

Communication System with an Incoming Call to a Personal Digital Assistant—FIGS. 6-7

FIGS. 6-7 disclose one embodiment of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention.

In this embodiment, the alerting device is a wireless personal digital assistant that has pager capabilities to receive pager messages but not voice capabilities to handle a voice call. Once alerted of the incoming call, the user calls from a public telephone to join in a conference bridge that the incoming call is connected to.

FIG. 6 depicts a block diagram of a communication system 600 with a personal digital assistant (PDA) 610 and a telephone 660 in an example of the invention. The communication system 600 comprises the PDA 610, a wireless base station 620, a service control point 630, a Public Switched Telephone Network (PSTN) 640, a switching system 650, the telephone 660, and a conference bridge system 670. The PDA 610 is configured to communicate with the wireless base station 620 using wireless signals. The wireless base station 620 is connected to the service control point 630. The service control point 630 is connected to the PSTN 640 and the switching system 650. The PSTN 640 is connected to the switching system 650 and the conference bridging system 670. The switching system 650 is connected to the telephone 660. The conference bridge system 670 is a system configured to provide conference bridges where numerous users have the ability to hear and speak to other users in the conference bridge. Those skilled in the art understand conference bridges and the conference bridge system 670.

FIG. 7 depicts a message sequence chart for the communication system 600 with the PDA 610 and the telephone 660 in an example of the invention. The PSTN 640 generates and transmits a TCAP query to the SCP 630 to set up an incoming call. The SCP 630 processes the TCAP query for the incoming call and determines that the incoming call for the called party should be intercepted. The SCP 630 then creates a session with a session identifier.

The SCP 630 then generates and transmits a query for an unoccupied conference bridge to the conference bridge system 670. The conference bridge system 670 processes the query to identify an unoccupied conference bridge. The conference bridge system 670 then generates and transmits a reply to the query with a bridge number for the unoccupied conference bridge. The SCP 630 then associates the bridge number with the session ID. The SCP 630 then generates a first routing instruction with the bridge number that extends the incoming call from the PSTN 640 to the conference bridge system 670. The conference bridge system 670 then places the incoming call with the conference bridge with the associated bridge number. In one embodiment, the conference bridge system 670 plays an audio message notifying the caller to wait while the called party is alerted. Those skilled in the art understand there are numerous devices and communication system configurations that can play this audio message.

The SCP 630 generates and transmits an alert message for the incoming call to the PDA 610 via the wireless base station 620. The PDA 610 receives the alert message. The user of the PDA 310 then locates the telephone 660. The user then uses a response mechanism within the PDA 610 to dial a number from the telephone 660 and respond with the session ID. The switching system 650 then generates and transmits a TCAP query to the SCP 630 for this second call. The SCP 630 processes the TCAP query and determines to intercept the second call in order to connect the second call to the conference bridge. The SCP 630 then generates and transmits a second routing instruction that routes the second call to the conference bridge system 670 based on the session ID and the associated bridge number. Once the telephone 660 extends the second call to the switching system 450, the switching system 650 then routes the second call to the conference bridge system 670 to join the conference bridge with the original incoming call.

For this embodiment, the calling party advantageously does not have to pre-provision any conference bridging capability. The SCP 630 automatically provisions the conference bridge without the calling party and the called party's knowledge. Thus, the called party bypasses any access sequence to join the conference bridge.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a service control point, the method comprising:

receiving a call set-up message into the service control point for an incoming call;

processing the call set-up message to identify a first device where the first device is a wireless device;

generating an alert message indicating the incoming call and caller information from the call set-up message;

transmitting the alert message from the service control point to the first device;

receiving a response message into the service control point from the first device wherein the response message indicates a second device to receive the incoming call;

processing the response message to generate a routing instruction that connects the incoming call to the second device; and transmitting the routing instruction from the service control point.

2. The method of claim 1 wherein the second device comprises a pager, a personal digital assistant, or a cellular phone.

3. The method of claim 1 wherein the call set-up message comprises a Transaction Capabilities Application Part query.

4. The method of claim 1 wherein the alert message comprises a called number, a dialed number, or a caller number.

5. The method of claim 1 further comprising determining whether the incoming call is to be intercepted for a called party.

6. The method of claim 1 further comprising generating a session for the incoming call with a session identifier.

7. A computer-readable medium having encoded thereon instructions that, when executed by a processor, direct the processor to:

receive a call set-up message for an incoming call, process the call set-up message to identify a first device where the first device is a wireless device, generate an alert message indicating the incoming call and caller information from the call set-up message, transmit the alert message to the first device, receive a response message from the first device wherein the response message indicates a second device to receive the incoming call, process the response message to generate a routing instruction that connects the incoming call to the second device, and transmit the routing instruction.

8. The computer-readable medium of claim 7 wherein the first device comprises a pager, a personal digital assistant, or a cellular phone.

9. The computer-readable medium of claim 7 wherein the call set-up message comprises a Transaction Capabilities Application Part query.

10. The computer-readable medium of claim 7 wherein the alert message comprises a called number, a dialed number, or a caller number.

11. The computer-readable medium of claim 7 wherein the instructions, when executed by the processor, direct the processor to determine whether the incoming call is to be intercepted for a called party.

12. The computer-readable medium of claim 7 wherein the instructions, when executed by the processor, direct the processor to generate a session for the incoming call with a session identifier.

13. A communication system comprising:
a service control point (SCP) comprising:
a processor configured to receive a call set-up message for an incoming call, process the call set-up message to identify a first device where the first device is a wireless device, generate an alert message indicating the incoming call and caller information from the call set-up message, transmit the alert message to an SCP interface, receive a response message from the first device wherein the response message indicates a second device to receive the incoming call, process the response message to generate a routing instruction that connects the incoming call to the second device, and transmit the routing instruction; and
the SCP interface connected to the processor and configured to transfer the call set-up message to the processor, transfer the alert message from the processor to the first device, and transfer the routing instruction from the processor.

14. The communication system of claim 13 wherein the first device comprises a pager, a personal digital assistant, or a cellular phone.

15. The communication system of claim 13 wherein the call set-up message comprises a Transaction Capabilities Application Part query.

16. The communication system of claim 13 wherein the alert message comprises a called number, a dialed number, or a caller number.

17. The communication system of claim 13 wherein the processor is configured to determine whether the incoming call is to be intercepted for a called party.

18. The communication system of claim 13 wherein the processor is configured to generate a session for the incoming call with a session identifier.

19. The communication system of claim 13 further comprising a switching system connected to the SCP and configured to process the routing instruction that connects the incoming call with the second device.

* * * * *